US010104484B1

United States Patent
Bradford et al.

(10) Patent No.: US 10,104,484 B1
(45) Date of Patent: Oct. 16, 2018

(54) SYSTEM AND METHOD FOR GEOLOCATING EMITTED ACOUSTIC SIGNALS FROM A SOURCE ENTITY

(71) Applicants: Steven Kenneth Bradford, Edmond, OK (US); Britton James Bradford, Hopkinton, MA (US)

(72) Inventors: Steven Kenneth Bradford, Edmond, OK (US); Britton James Bradford, Hopkinton, MA (US)

(*) Notice: Subject to any disclaimer, the term of this patent is extended or adjusted under 35 U.S.C. 154(b) by 0 days.

(21) Appl. No.: 15/727,947

(22) Filed: Oct. 9, 2017

Related U.S. Application Data

(60) Provisional application No. 62/465,884, filed on Mar. 2, 2017.

(51) Int. Cl.
| | |
|---|---|
| *H04R 29/00* | (2006.01) |
| *G01S 5/22* | (2006.01) |
| *H04R 3/00* | (2006.01) |
| *H04R 1/40* | (2006.01) |
| *G10L 25/51* | (2013.01) |

(52) U.S. Cl.
CPC .............. *H04R 29/00* (2013.01); *G01S 5/22* (2013.01); *G10L 25/51* (2013.01); *H04R 1/406* (2013.01); *H04R 3/005* (2013.01)

(58) Field of Classification Search
CPC ........ H04R 29/00; H04R 1/406; H04R 3/005; G01S 5/22; G10L 25/51
USPC ....................................... 381/56, 58
See application file for complete search history.

(56) References Cited

U.S. PATENT DOCUMENTS

| | | | |
|---|---|---|---|
| 5,452,364 A | * | 9/1995 | Bonham ............. A01M 31/002 381/122 |
| 7,522,736 B2 | | 4/2009 | Adcock et al. |
| 7,761,291 B2 | | 7/2010 | Renevey et al. |

(Continued)

FOREIGN PATENT DOCUMENTS

JP           2002099545           4/2002

OTHER PUBLICATIONS

"Field test of an affordable, portable, wireless microphone array for spatial monitoring of animal ecology and behaviour," Mennill et al. (2012).

(Continued)

*Primary Examiner* — Vivian Chin
*Assistant Examiner* — Ammar Hamid
(74) *Attorney, Agent, or Firm* — McAfee & Taft, A Professional Corporation

(57) ABSTRACT

A computer-implemented system and method for identifying and locating an emitted acoustic signal from a source entity is disclosed. The system and method is capable of distinguishing between source entities of the same type. The system and method may further allow a user of the system to observe the movement of a source entity in real-time from a remote location as well as access stored data representative of the movement of the source entity from a remote location. The system and method is capable of identifying the identity of a source entity by using an average sound source comparing a received emitted acoustic signal from the source entity to a database of sounds. The system and method is capable calculating the source entity's distance and direction from an origin input sensor for each occurrence of emitted acoustic signals received from the source entity.

20 Claims, 11 Drawing Sheets

(56) References Cited

U.S. PATENT DOCUMENTS

| | | |
|---|---|---|
| 7,821,406 B2 | 10/2010 | Wangrud |
| 7,872,574 B2 | 1/2011 | Betts et al. |
| 7,908,083 B2 | 3/2011 | Peters et al. |
| 8,627,723 B2 | 1/2014 | Agranat |
| 8,983,089 B1 * | 3/2015 | Chu ........................ H04R 3/005 381/58 |
| 2015/0037770 A1 | 2/2015 | Philp |

OTHER PUBLICATIONS

"Acoustic monitoring in terrestrial environments using microphone arrays: applications, technological considerations and prospectus," Blumstein et al., (2011).

"Accuracy of an acoustic location system for monitoring the position of duetting songbirds in tropical forest," Mennill, Burt, Fristrup and Vehrencamp (May 2006).

"LOUD: A 1020-Node Modular Microphone Array and Beamformer for Intelligent Computing Spaces." Weinstein et al., (Apr. 2004).

"Automated Wildlife Monitoring Using Self-Configuring Sensor Networks Deployed in Natural," Trifa et al. (Jan. 1, 2007).

"Microphones for nature recording I, : types and arrays," Christine Hass (2009).

* cited by examiner

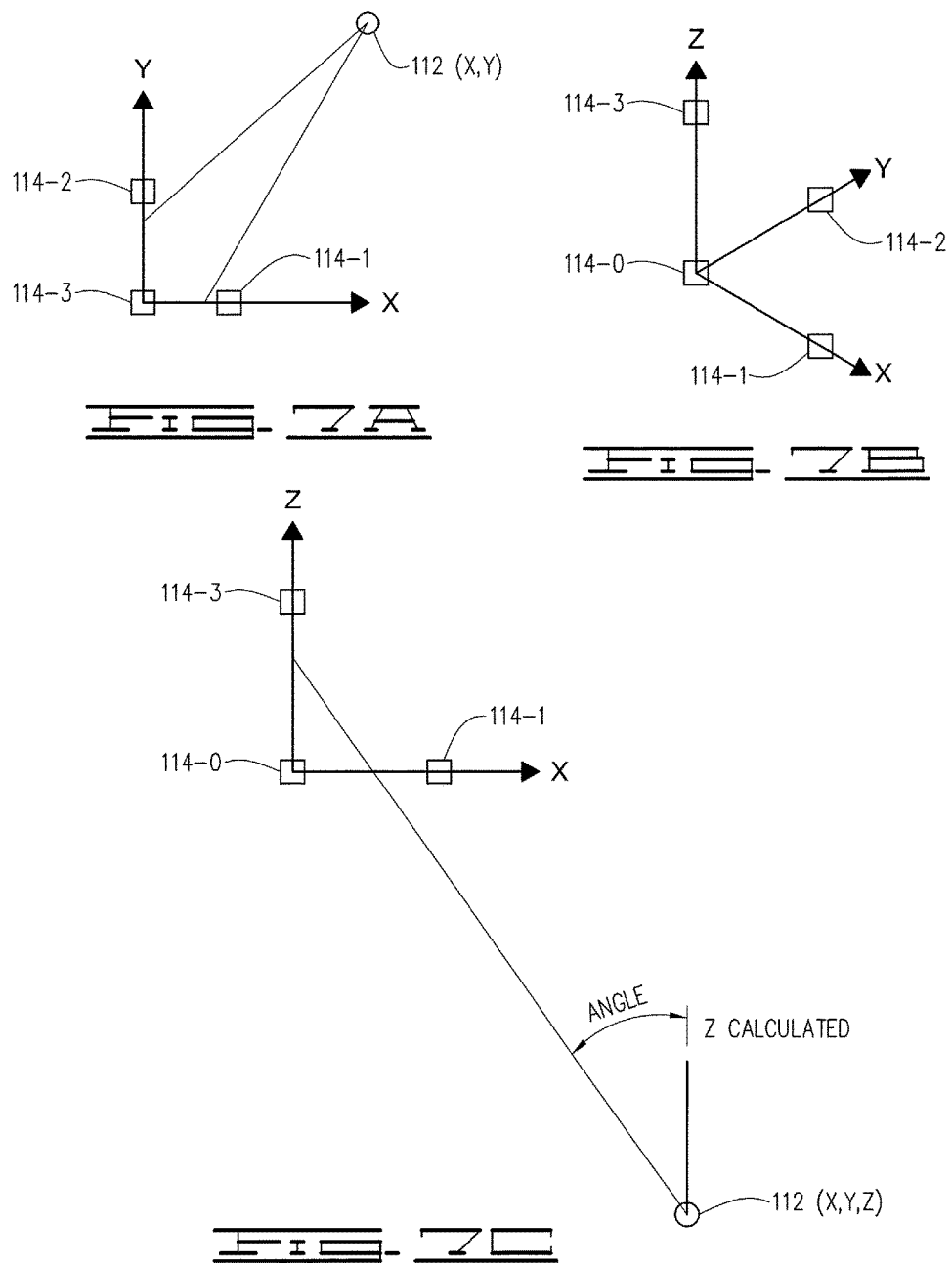

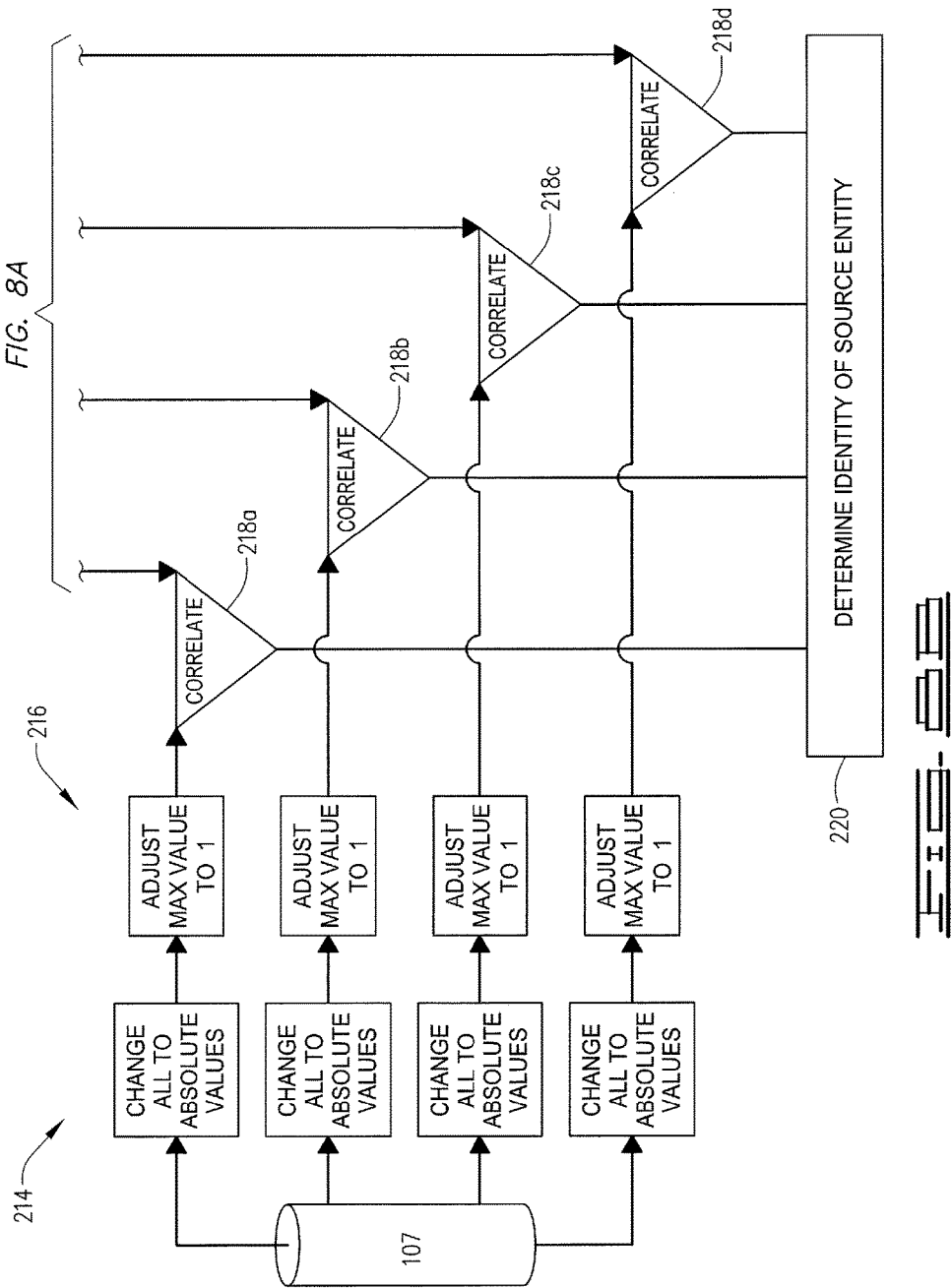

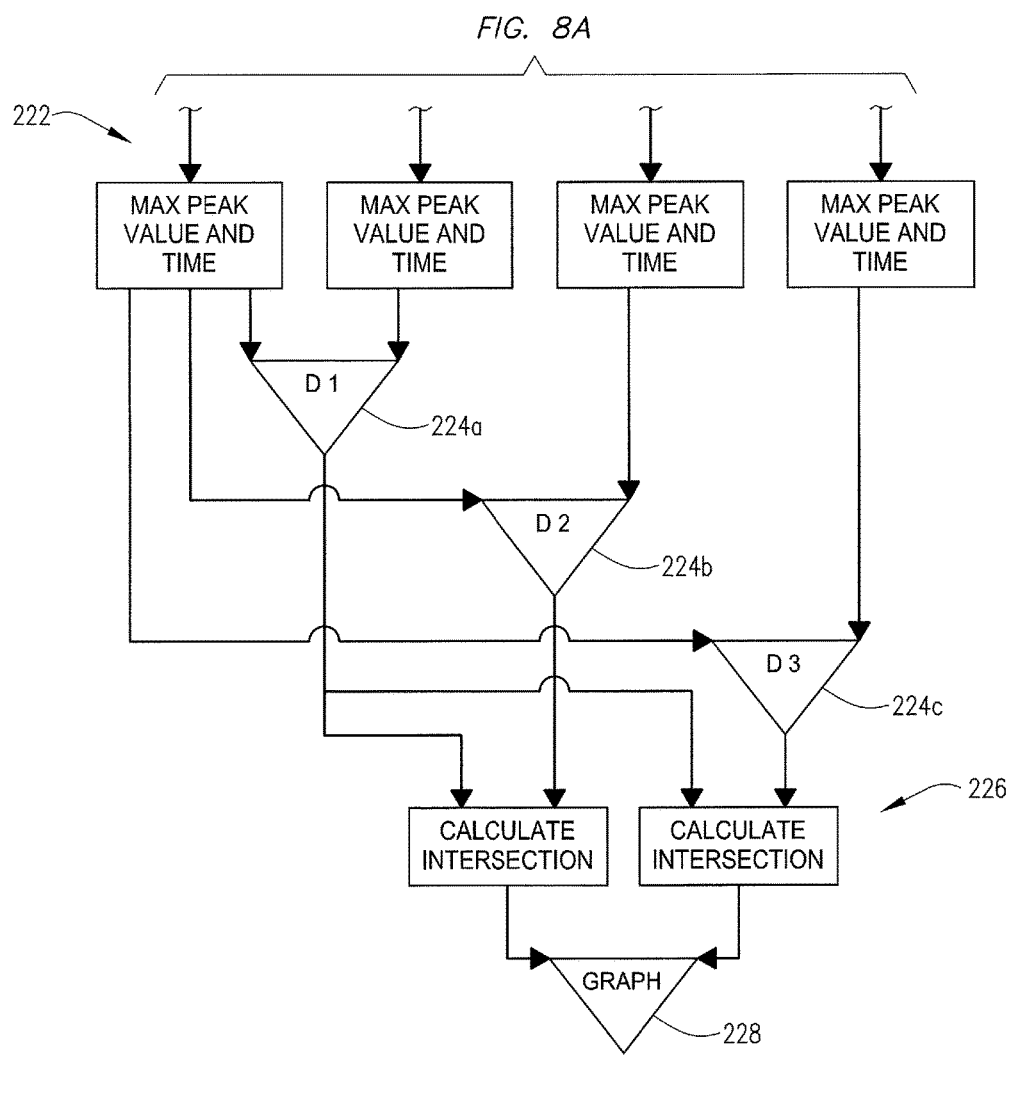

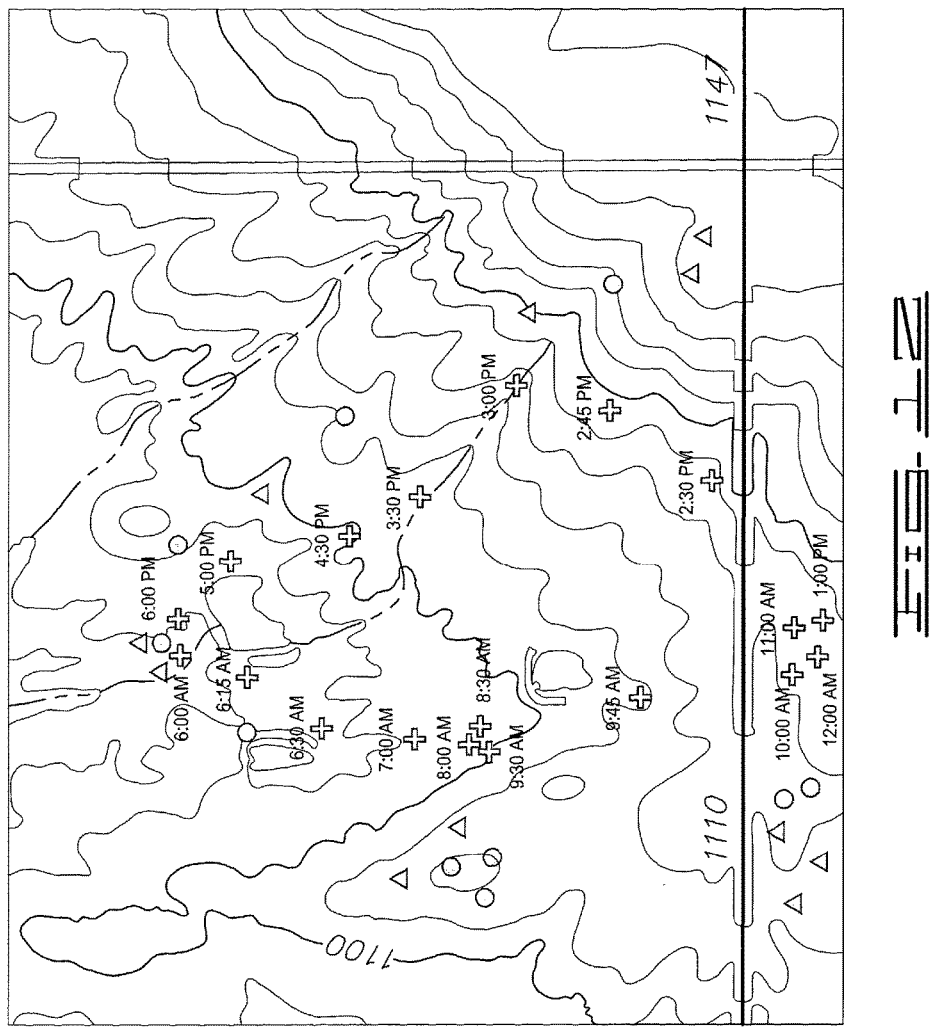

SYSTEM AND METHOD FOR GEOLOCATING EMITTED ACOUSTIC SIGNALS FROM A SOURCE ENTITY

CROSS-REFERENCE TO RELATED APPLICATIONS

This application claims priority from U.S. Provisional Patent Application Ser. No. 62/465,884, entitled SYSTEM AND METHOD FOR GEOLOCATING EMITTED ACOUSTIC SIGNALS FROM A SOURCE ENTITY, filed Mar. 2, 2017, the entire contents of which are incorporated herein by reference.

BACKGROUND

A computer-implemented system and method for identifying and locating an emitted acoustic signal from a source entity is disclosed. The system and method may further allow a user of the system to observe the movement of a source entity in real-time from a remote location as well as access stored data representative of the movement of the source entity from a remote location. The disclosed system and method may be utilized for various applications, including in connection with wildlife. In such a scenario, the computer-implemented system and method is capable of identifying the specific wildlife creature by its emitted analog acoustic signals or vocalizations, distinguishing between wildlife creatures of the same type, e.g. turkey 1 and turkey 2, based on the received emitted analog acoustic vocalizations from each wildlife, and locating the approximate position of the wildlife creature at the time of each received emitted analog acoustic vocalization thereby allowing a user to observe the wildlife creature's movement over a period of time.

SUMMARY

A system comprising at least three input sensors configured to receive an acoustic signal; and a computing device operatively connected to each of said at least three input sensors, wherein said computing device includes a processor configured to: identify a source entity of an acoustic signal based on an emitted acoustic signal from said source entity, and determine an approximate position of said source entity based on said emitted acoustic signal.

A computer-implemented method comprising the steps of: identifying a source entity of an acoustic signal based on an emitted acoustic signal from said source entity; and determining an approximate position of said source entity based on said emitted acoustic signal; wherein the steps are carried out by at least one computing device.

A system comprising: at least three input sensors, said at least three input sensors including an origin sensor, each of said input sensors configured to receive an acoustic signal from a source entity; and a computing device operatively connected to each of said at least three input sensors. Wherein said computing device includes at least one processor configured with executable instructions that cause said at least one processor to perform operations including: generate a plurality of modified digital signals. Wherein the step of generating includes the steps of: receiving a plurality of digital signals representative of said emitted acoustic signal received at said plurality of input sensors, and modifying each of said plurality of digital signals to create said plurality of modified digital signals by taking an absolute value of all values of each of said plurality of digital signals and adjusting a maximum value of the absolute value of each of said plurality of digital signals to one. The processor of the computing device is also configured to identify said source entity of said acoustic signal based on said emitted acoustic signal. Wherein the step of identifying said source entity of said acoustic signal based on said emitted acoustic signal includes the steps of: receiving a modified template sound, and cross-correlating each of said modified digital signals and said modified sound template together to produce a plurality of cross-correlated matrices to determine if a match between said modified digital signal and said modified sound template exists, such that said match corresponds to identifying an identity of said source entity. The processor of the computing device is also configured to determine an approximate position of said source entity based on said emitted acoustic signal. Wherein the step of determining an approximate position of said source entity based on said emitted acoustic signal includes the steps of: analyzing a peak of each of said plurality of modified digital signals to obtain a plurality of time difference values, wherein said peak corresponds to a magnitude of said peak and a time corresponding to said magnitude of said peak, wherein said analyzing step includes taking a difference between a peak of a modified digital signal obtained from said acoustic signal received at said origin sensor and each modified digital signal obtained from said acoustic signal received at each of said other input sensors to obtain each of said plurality of time difference values. For each plurality of time difference values, determining an intersection between each of said plurality of time difference values; identifying a quadrant from where said source entity emitted said acoustic signal; and calculating a standard deviation and a center of said plurality of time difference values and omitting from said calculating step one or more intersections of time difference values of input sensors not in the same identified quadrant of said source entity, wherein said approximate position of said source entity is said center.

A method for identifying and locating an acoustic signal emitted from a source entity and received at a plurality of input sensors, including an origin sensor, the method comprising the steps of: generating, by a processor, a plurality of modified digital signals. Wherein the step of generating includes the steps of: receiving a plurality of digital signals representative of said emitted acoustic signal received at said plurality of input sensors, and modifying each of said plurality of digital signals to create said plurality of modified digital signals by taking an absolute value of all values of each of said plurality of digital signals and adjusting a maximum value of the absolute value of each of said plurality of digital signals to one. The method further including the step of identifying, by the processor, said source entity of said acoustic signal based on said emitted acoustic signal. Wherein the step of identifying said source entity of said acoustic signal based on said emitted acoustic signal includes the steps of: receiving a modified template sound, and cross-correlating each of said plurality of modified digital signals and said modified template sound together to produce a plurality of cross-correlated matrices to determine if a match between said plurality of modified digital signals and said modified template sound exists, such that said match corresponds to identifying an identity of said source entity. The method further including the step of determining, by the processor, an approximate position of said source entity based on said emitted acoustic signal. Wherein the step of determining an approximate position of said source entity based on said emitted acoustic signal includes the steps of: analyzing a peak of each of said plurality of modified digital signals to obtain a plurality of time difference values, wherein said peak corresponds to a magnitude of said peak and a time corresponding to said magnitude of said peak, wherein said analyzing step includes taking a difference between a peak of a modified digital signal obtained from said acoustic signal received at said origin sensor and each modified digital signal obtained from said acoustic signal received at each of said other input sensors to obtain each of said plurality of time difference values. For each plurality of time difference values, determining an intersection between each of said plurality of time difference values; identifying a quadrant from where said source entity emitted said acoustic signal; and calculating a standard deviation and a center of said plurality of time difference values and omitting from said calculating step one or more intersections of time difference values of input sensors not in the same identified quadrant of said source entity, wherein said approximate position of said source entity is said center.

BRIEF DESCRIPTION OF THE DRAWINGS

FIGS. 7a-7c illustrate various views of an example configuration of input sensors to obtain a three-dimensional vector for the system and method for geolocating emitted acoustic signals from a source entity.

FIG. 10 illustrates an example visual display associated with the method depicted in FIG. 9 of the system and method for geolocating emitted acoustic signals from a source entity where a layout of a home range polygon is superimposed on a topographical map for a given source entity.

FIG. 12 illustrates an example visual display associated with the method depicted in FIG. 9 of the system and method for geolocating emitted acoustic signals from a source entity depicting three days of approximate locations representing movement of a given source entity and the associated time-stamp for a single given day of approximate locations is superimposed on a topographical map.

DETAILED DESCRIPTION

A computer-implemented system and method for identifying and locating an emitted acoustic signal from a source entity is disclosed. The system and method may further allow a user of the system to observe the movement of a source entity in real-time from a remote location or directly at the location in which the system is deployed. The system and method may further allow a user of the system to observe the movement of a source entity at a later time by enabling access to stored data representative of the movement of the source entity from a remote location at directly at the location in which the system is deployed.

Figure 1:
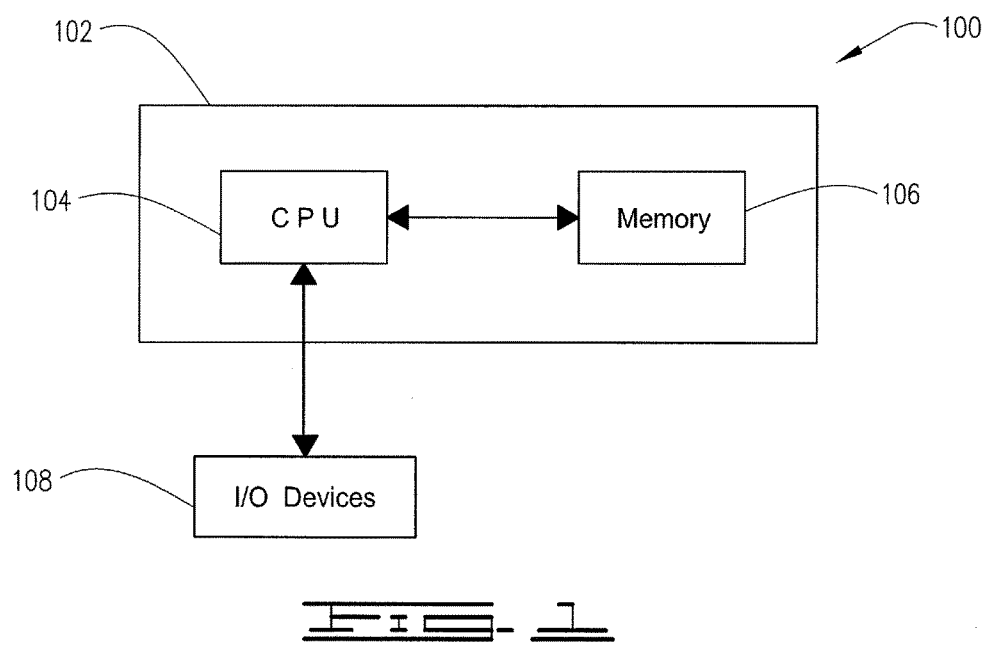
FIG. 1 is a simplified block diagram that shows an example of a computing device used in connection with the system and method for geolocating emitted acoustic signals from a source entity.

FIG. 1 is a block diagram for a system 100 suitable for implementing and performing the system and method for geolocating emitted acoustic signals from a source entity described herein. System 100 includes a computing device 102 operably connected to one or more input/output (I/O) devices 108. Computing device 102 is representative of various forms of computing devices, including desktops, laptops, workstations, servers, mobile devices, such as personal digital assistants, tablets, smart-phones, cellular telephones, and other similar computing devices.

Computing device 102 includes a central processing unit (CPU) 104. CPU 104 includes one or more processors reading and/or executing instructions, programs, and applications stored in memory 106 and computer readable storage media of I/O devices 108, and accessing and/or storing data in memory 106 and computer readable storage media of I/O devices 108. CPU is operably connected with memory 106. CPU 104 is also operably connected with I/O devices 108 through an applicable interface component for the corresponding I/O device 108, e.g. port (serial, parallel USB), wire, card (sound, video, network), or the like. Exemplary types of CPU 104 may include general purpose processors, digital programmable devices, microcontrollers, digital signal processors (DSPs), application specific integrated circuit (ASIC), and field programmable gate array (FPGA), or other components and combinations thereof designed to perform the functions described herein.

Memory 106 includes data storage, volatile memory, e.g. random access memory (RAM), and non-volatile memory, e.g. read only memory (ROM).

I/O devices 108 include various devices that a user may use to interact with the computing device 102. Representative I/O devices 108 include keyboards, touchscreens, mouse and other pointing devices; a visual display device, such as a cathode ray tube, liquid crystal display, screens, and other suitable display devices for visually communicating and interacting with the user; audio devices, such as a microphone, headphones, speakers; and print devices for printing, scanning, faxing, and/or transmitting data and images. I/O devices 108 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 108 may also include a communication device for connecting system 100 with one or more other computing systems over a network, e.g. wired and/or wirelessly, utilizing one or more communications protocols, e.g. IEEE 802.11, IEEE 802.3, TCP/IP, cellular protocols, radio frequency, any other communications protocols, and combinations thereof.

System 100 may include one or more I/O devices 108 of the same type or of different types and combinations thereof and one or more computing devices 102 of the same type or of different types and combinations thereof operably connected to each other.

The functions, methods, or algorithms described herein may be implemented in hardware, software, firmware, or any combination thereof. When implemented in software, the described method may be stored or reside in memory, computer-readable storage media, and/or combinations thereof and transmitted as one or more instructions or code to cause one or more CPU 104 to operate in accordance with the methods and teachings of the present disclosure. The operable connection of the various components of system 100 described in reference to FIG. 1 include buses, circuitry, wires, wireless, or other similar connections. The functions, methods, and techniques described herein may be implemented by one or more computing systems in cooperation with each other. The components of system 100 shown and described, including their relationships and functions, are exemplary and are not to limit the implementation of the system, methods, and techniques described herein.

The software containing the instructions and programs, including application program, for implementing and performing the described methods and techniques of the system may be stored locally in the computing device's memory, stored remotely on a mass storage device, stored in the memory of a remote computing device, and combinations of any of the foregoing.

For example, the described system and method for geolocating emitted acoustic signals from a source entity may be used to identify, locate, and track biological entities based on the biological entities' emitted acoustic signal(s). For ease of reference, the following description of the system and method for geolocating emitted analog acoustic signals from a source entity will be described with reference to acoustic signals emitted from biological entities, e.g. animals.

As previously discussed, the disclosed computer-implemented system and method is capable of identifying a specific biological creature by its emitted analog acoustic signals or vocalizations, distinguishing between biological creatures of different types, e.g. animal 1 (turkey) and animal 2 (deer), and distinguishing between biological creatures of the same type, e.g. turkey 1 and turkey 2, based on the received emitted analog acoustic signal(s) (or vocalizations) from each biological creature, and locating the approximate position of the wildlife creature at the time of each received emitted analog acoustic vocalization thereby allowing a user to observe through a visual display of the computing device 102 or a remote human machine interface (HMI) 110 operably connected to system 100 the biological creature's movement over a period of time.

Figure 2:
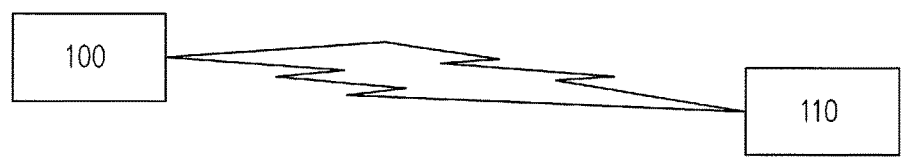
FIG. 2 is an example networked configuration of an example system and method for geolocating emitted acoustic signals from a source entity.

With reference to FIG. 2, the system may be in communication with a remote HMI 110 such as another computing device, a mobile device, a computer, a laptop, and the like. The communication may be wired or wireless communication utilizing known communication protocols in the art. The user of the HMI 110 may be able to make adjustments to certain parameters of the system 100 as described below and use the HMI 110 to view the data collected and analyzed by the computing device 102 of system 100.

Figure 3:
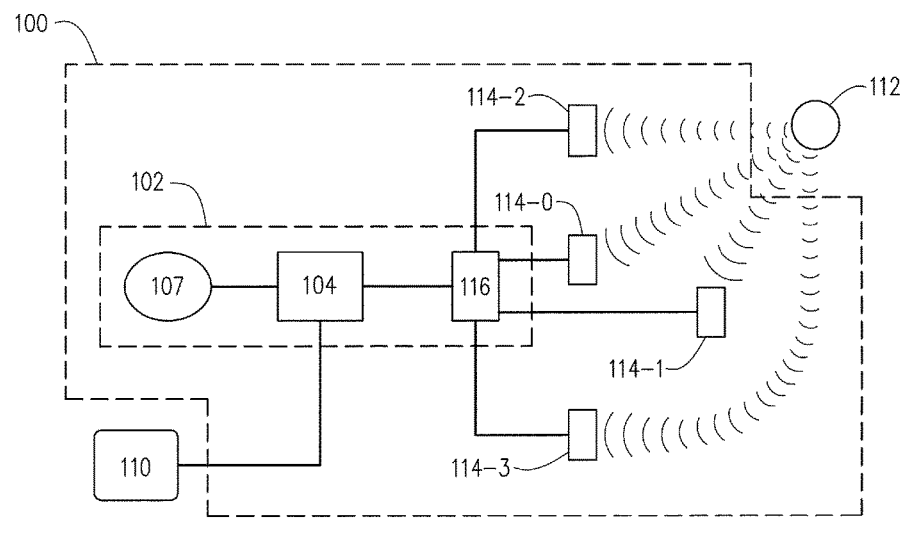
FIG. 3 illustrates a more detailed view of the example networked configuration of an example system and method for geolocating emitted acoustic signals from a source entity.

FIG. 3 illustrates a more detailed view of the example networked configuration of an example system 100 and method for geolocating emitted acoustic signals from a source entity 112. As shown in FIG. 3, the system 100 includes at least three input sensors 114 capable of receiving acoustic signals from source entity 112. For example, input sensors 114 may be microphones operably connected to associated hardware and software for converting the received acoustic analog signal to a digital signal, e.g. s signal conversion device 116 such as an analog to digital converter (ADC), and any other hardware and software. The input sensors 114 and associated signal conversion devices are operably connected to a computing device 102 having a data repository 107 of template sound data. The computing device 102 is also capable of adding new data to its data repository 107 and capable of processing the received signals and performing the method and techniques disclosed herein. The computing device 102 may also include the associated signal conversion devices therein. Although not depicted, a power source is operably coupled to the system 100. The power source may any type of power source known in the art, including battery, generator, solar, etc. suitable for providing the system with the necessary operating power to carry out the described method and functions. The input sensors 114 may be operably connected to the signal conversion device 116 and/or computing device 102 via wired connection and/or wireless connection. Suitable microphone input sensors 114 include omnidirectional microphones, and/or electric microphones.

The computing device 102 includes a data repository 107 of template signals or sounds. These sounds are representative of the acoustic signals emitted by one or more source entities 112. For example, a turkey is capable of making multiple vocalizations or calls, such as a gobble, cluck, cut, purr, yelp, and cackle, etc. Similarly deer are capable of making various types of vocalizations or calls, e.g. grunt, bleat, and bellow, etc. The system 100 is configured to capture and distinguish between a plurality of different emitted acoustic signals of a multitude of source entities 112 of the same or different types. The extent of such capability is subject to the computing power and availability of storage media available for the computing device 102 used. The template sound may be a pre-recorded sound or uploaded from a library of sounds. The template sound may be stored on and resident in the computing device 102, and/or a computer-readable storage device and provided to the computing device 102 of the present system from a remote cloud-based data storage. The upload can be accomplished by wire, radio frequency, Bluetooth, satellite, cell phone carrier, and any other communication protocols known in the art. The template sound is a digital representation of the pre-recorded or uploaded sound of the specific vocalization from a source entity 112. As will be further discussed herein, the template sound is designated as TC(*).

In use, the system 100 is a portable system that is set up and arranged at a location, such as a field, forest, or other location dependent upon the type of analog acoustic signals desired to be received and monitored. Each input sensor 114 and the computing device 102 can be positioned on a support structure, e.g. a stand, and/or mounted to an object, such as a tree or other projectile emanating out of or anchored to the earth.

Figure 4:
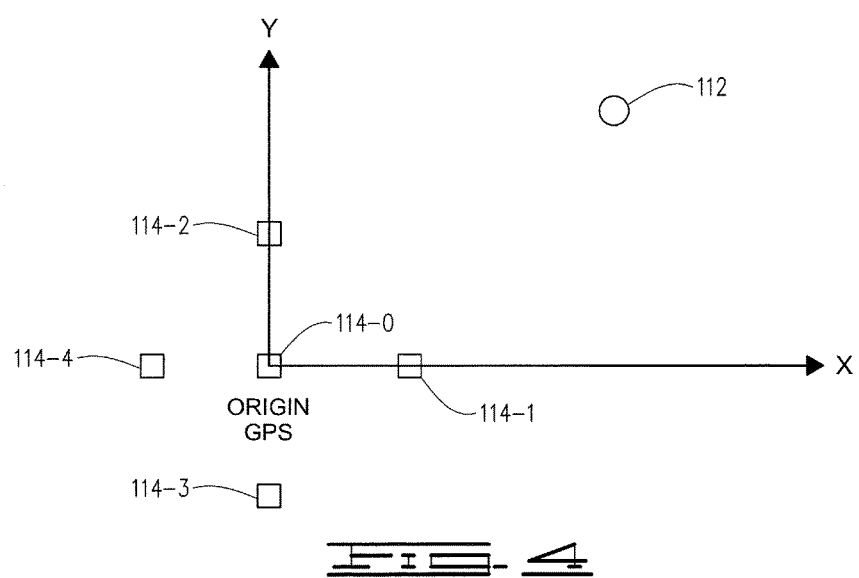
FIG. 4 is an example configuration of input sensors of the system and method for geolocating emitted acoustic signals from a source entity.

For example, when used to monitor wildlife, the system 100 may be set up in the arrangement depicted in FIG. 4 or 7. For example, to obtain the approximate position of a source entity 112 for two-dimensions, at least three input sensors 114 are required; two input sensors 114 should be arranged around an origin input sensor along the x- and y-axis thereof as shown in FIG. 4. To obtain the approximate position of a source entity 112 for three-dimensions, at least four input sensors 114 are required. Three input sensors 114 can be arranged around an origin input sensor 114-0 along the x-, y-, and z-axis thereof as depicted in FIGS. 7a-7c. The number of input sensors 114 can be more than those depicted. For ease of discussion, the present disclosure is made in reference for identifying and locating a source entity 112 using two-dimensions.

When the portable system 100 is initially set up at a given location, the coordinates of the origin input sensor, e.g. 114-0, are recorded via a hand held device that reads the global positioning system (GPS) coordinates (or converts the Cartesian coordinates to GPS coordinates) and stores the coordinates in the computing device 102. (See FIG. 9 at blocks 300, 302, and 304). The other input sensors 114 may be located in an array around the origin input sensor 114-0. The other input sensors' distance spacing from the origin are recorded via a hand held device that may take the Cartesian coordinates of the input sensor and coverts the same to GPS coordinates then stores the GPS coordinates in computing device 102. (See FIGS. 9, 300, 302, and 304). The other input sensors' distance spacing from the origin may be recorded via a hand held device that reads the GPS coordinate data and stores the same in the computing device of the system. This is an application that runs on a hand held device, e.g. HMI, such as a cell phone or other portable computing device. The upload can be done via wired communications, wireless communications, and any combination thereof, including, without limitation, radio communications, Bluetooth, satellite, cell phone carrier, communications using the IEEE 802.11 family of standards and the like. The computing device 102 of the system 100 is located at or near the origin input sensor 114-0.

Once positioned and operating, the computing device 102 may receive and convert the received acoustic signal from each input sensor 114. Each input sensor 114 may be operably coupled to a computing device 102 that filters and converts the received acoustic signal to a digital signal and communicates the converted digital signal(s) to computing device 102, see e.g. FIG. 8a at 202, 204, and 206. Each received analog acoustic signal is converted to a digital representation of the received signal and stored as a data matrix with the following information: the amplitude of the received signal, the channel, i.e. identification of the specific input sensor 114 (channel), and the time the received signal was received. The data matrix for each input sensor 114 is designated in the form of TC#(*), where # is the number or identification of the specific input sensor (channel), e.g. TC0 or TC corresponds to input sensor 114-0—the origin input sensor; TC1 corresponds to input sensor 114-1 and so on to 114-N, where N is an integer. The system 100 may also be configured to filter the received acoustic signal to remove environmental noises such as wind and frequencies up to four times the sampling frequency of the A/D converter. For example, a sampling frequency range can be between and including 0 hertz (Hz) to 4,000 Hz. Other sampling frequency ranges may be used depending upon the application for which the disclosed system 100 and method is utilized, see e.g. FIG. 8a at 204. The resulting digitized signal representative of the received acoustic analog signal from the source entity 112 from each input sensor 114 is utilized by the computing device 102 as further described herein.

With reference to FIGS. 4, 5, 8a, 8b, and 8c. To determine the identity of the source entity 112 and the approximate location thereof at the time source entity 112 emits an acoustic signal, a modified digital signal is generated by computing device 102.

The modified digital signal is the data matrix for each channel of the digital signal representative of the received acoustic signal at that channel is cross-correlated to the sounds of the template sound in the data repository 107 resulting in a cross-correlation matrix represented as TCC (i,j) as shown below:

$$TCC(i, j) := \sum_{i=0}^{5} \sum_{k=0}^{len} (|TC2(i, k+j)| \cdot |TC(i, k)|)^{coeff}$$

where 'i' is the number of recording channels. For example, with reference to the equation above, 5 is indicative of 5 recording channels; it should be appreciated that the value of the channels may vary to match a varying number of recording channels (i.e. input sensors 114). 'j' is the sample number in the received sound, "k" is the sample number in the stored recording of the template sound. "len" is the total size of stored samples in TC matrix of the template sound. "coeff" is used to modify the output of the correlation. For example, the coeff value can be between and including 1 and 2 and all values therebetween. For example, coeff may be 1.2. The coeff value may be adjusted and optimized by a user depending upon the end-use application of the system 100 and method. Prior to obtaining the resulting cross-correlation matrix for each channel, the absolute value of all amplitudes for each signal is taken and the maximum value of each digital signal from the input sensor 114 and the digital signal from the data repository 107 is adjusted to a value of 1 as shown in FIGS. 8a and 8b, see e.g. blocks 208, 210, and 214, and 216, respectively.

Figures 8B, 8C:
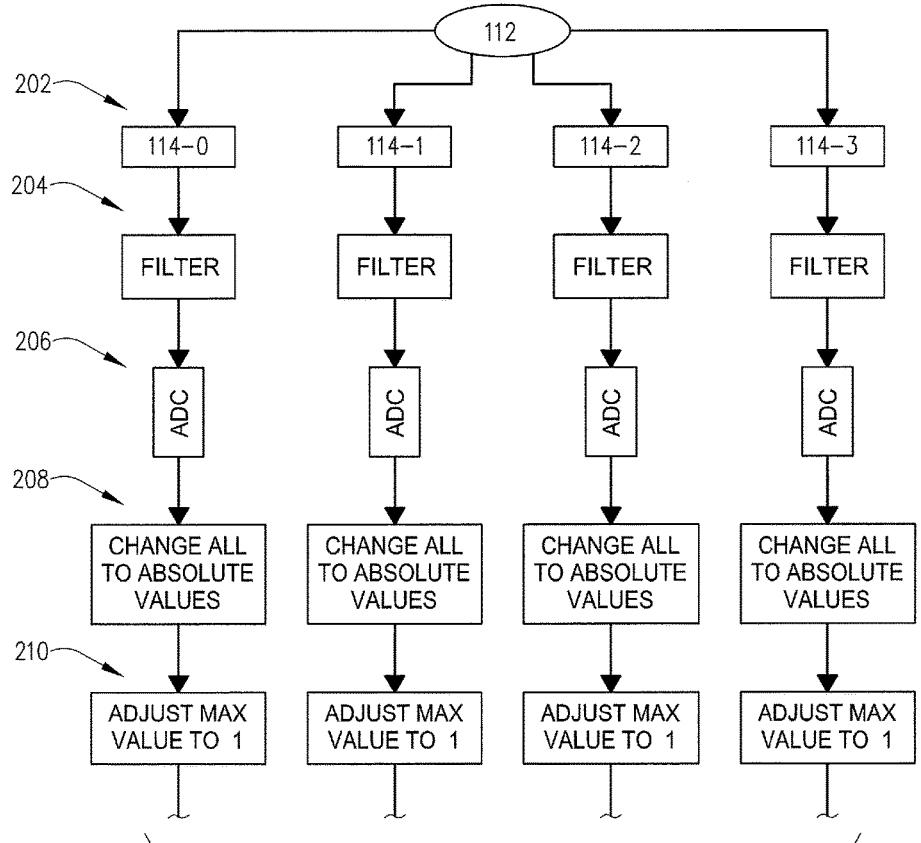
FIG. 8b is an example flow chart for the method of identifying the source entity of the emitted acoustic signals.
FIG. 8c is a example flow chart for the method of geolocating emitted acoustic signals from a source entity.
Figure 8A:
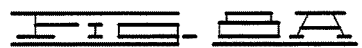
FIG. 8a is an example flow chart for signal processing for the method of identifying the source entity of the emitted acoustic signals and the method of geolocating emitted acoustic signals from a source entity.
Figure 8:
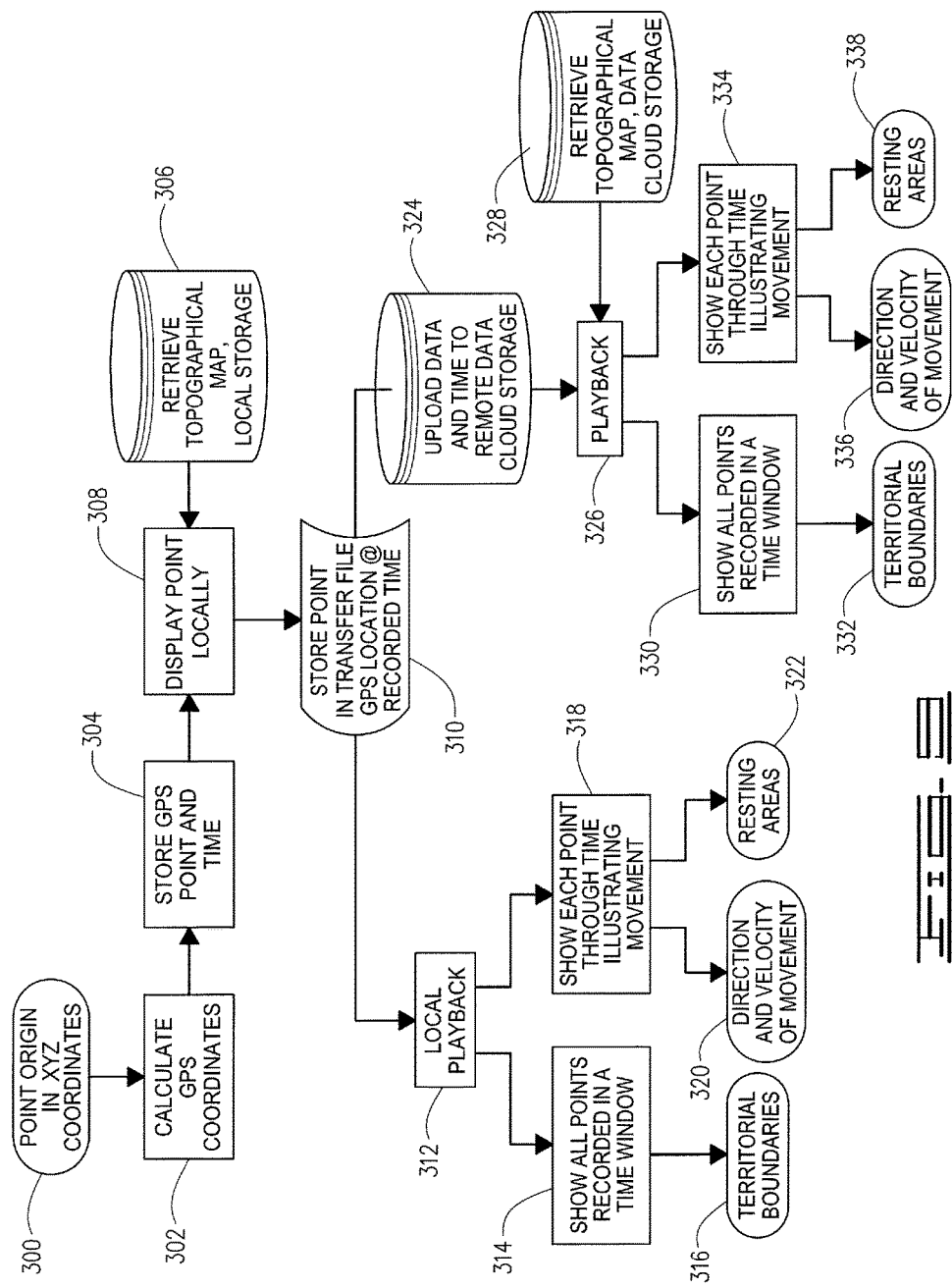

The cross-correlation is to determine how similar the signals are to each other and whether a match between the template sound and each channel's received emitted acoustic signal exists such that a determination of the identity of the source entity based on the received emitted acoustic signal, see e.g. FIG. 8a at 218a-d and 220. For example, if the sample matches the received signal, then the system and method have determined the identity of source entity 112. If there is not a match, the system and method repeat the process for all sounds in stored in data repository 107. Ultimately, if there is no corresponding match in data repository, the system and method will continue on but no identity will be determined for the source entity for that given received signal.

The system and method also determine the approximate location of the source entity for the given emitted acoustic signal emitted by the source entity 112. For example, a turkey as it moves within its home-range or territory may make various vocalizations, e.g. a gobble call, as it travels. As described herein, the system and method is capable of identifying that the source entity 112 that made each vocalization is a turkey as well as determine an approximate location for each of the turkey's vocalizations along its route.

With reference to FIG. 8c, steps 222-228, the approximate location for each vocalization is determined by analyzing the peak of each channel for the time of occurrence of the vocalization and the magnitude of such vocalization for each channel as represented by the following equation:

PEAK(i,m):=max(TC#(i,j))

The value for sampling time on channel i is m=0 and the value for the magnitude of the received sound is at m=1. As previously explained, the data matrix for each channel includes the amplitude of the received signal, the channel, i.e. identification of the specific input sensor (channel), and the time the received signal was received. Prior to obtaining the peak value for each channel (see e.g. FIG. 8c at 222), the absolute value of all amplitudes for each signal is taken and the maximum value of each digital signal from the input sensor is adjusted to a value of 1 as shown in FIG. 8a, see e.g. 208 and 210.

The system and method use the origin input sensor 114-0 as the base to evaluate the distance to determine an approximate location for each emitted acoustic signal of source entity 112. The data from PEAK(i,m) is compared to the each of the other channel's PEAK(i,m) data and the difference is recorded, see e.g. FIG. 8c at 224a-c. Whereas D1 is the difference of the recorded time of the received emitted acoustic signal from origin input sensor 114-0 and channel 1, i.e. a first input sensor 114-1. For example, D1:=PEAK(0,0)-Peak(1,0);D2:=PEAK(0,0)-PEAK(2,0); . . . Di:=PEAK(0,0)-PEAK(i,0).

Figure 5:
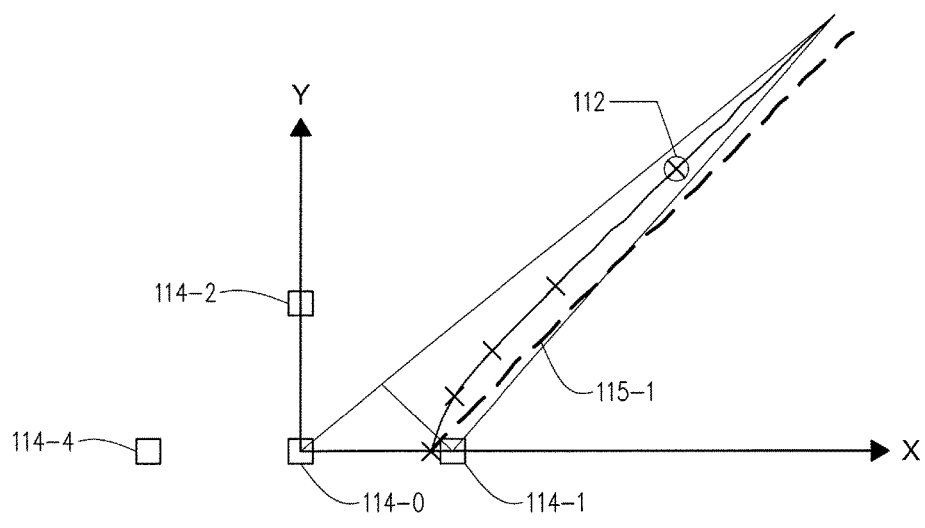
FIG. 5 illustrates an approximation location corresponding to one input sensor of the method for geolocating emitted acoustic signals from a source entity utilizing the example input sensor configuration of FIG. 4.
Figure 6:
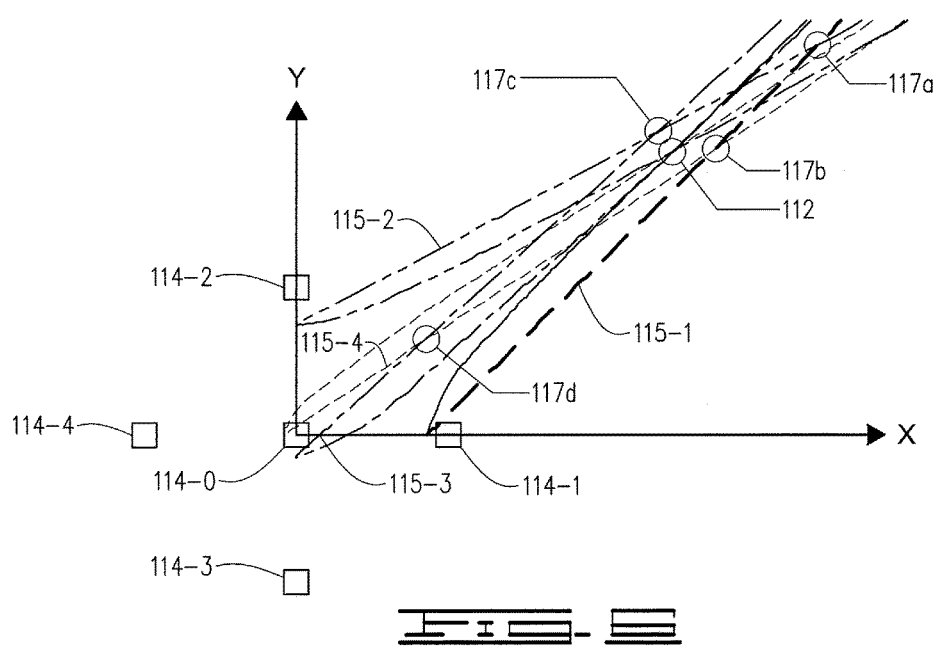
FIG. 6 illustrates approximation corresponding to the method for geolocating emitted acoustic signals from a source entity utilizing the example input sensor configuration of FIG. 4.

Referring to FIGS. 5 and 6, the approximate position of the source entity for the occurrence of the acoustic signal is determined, see e.g. step 226 of FIG. 8c. Utilizing the velocity of sound to be approximately 744 miles per hour, an equation can be used to calculate the approximate position of the source entity 112 for an occurrence of an emitted acoustic signal as measured from a grid starting at the origin input sensor 114-0. Depending on the environment in which the system 100 is utilized, the approximation for the velocity of sound can be adjusted in the system. Constant "d" is the distance that each of the input sensors 114 are placed. For example, d1 corresponds to the distance between input sensor 114-1 and the origin input sensor 114-0.

Linearized equations are used to determine the intersection which is x,y. This line is the asymptote of the curve that represents the direction and magnitude of time difference D1. The equation of the line based on time difference D1 as defined above is:

$$y = \tan\left(\operatorname{asin}\left(\frac{d2}{d}\right)\right) \cdot x + \frac{d+d2}{2},$$

see e.g. FIG. 5, 115-1. The equation of the line based on time difference "D2" is:

$$y = \tan\left(\operatorname{acos}\left(\frac{d1}{d}\right)\right) \cdot x + -\frac{d+d1}{2}.$$

The intersection of these two lines represents an approximate location of the source entity 112 at the time the acoustic signal was emitted. This process is repeated for all channels, see e.g. step 226 of FIG. 8c.

For example, as depicted in FIG. 6, having channels 0-4, there are four possible line intersections that are representative of the approximate location of the source entity 112 at the time it emitted the received acoustic signal. The source entity location for the emitted acoustic signal is shown in FIG. 6 with reference numeral 112. For example, with reference to FIG. 6, having the four possible line intersections depicted, i.e. 117a, 117b, 117c, and 117d, the approximate location of the source entity is determined as follows: (i) determining the quadrant of location that the source entity 112 emitted the acoustic signal by calculating the average center and the standard deviation of the intersections 117; (ii) removing the intersection(s) 117 of input sensors 114 that are not in or part of the same quadrant of the source entity 112 to remove any outliers. For example, with reference to FIG. 6, intersection 117d would result in the intersection of input sensors 114-3 and 114-4 being removed and leaving the remaining intersections, 117a, 117b, 117c. e.g. the intersections of input sensors 114-1 and 114-2, 114-2 and 114-4, and 114-2 and 114-3, respectively. The steps for determining the approximate location proceeds as (iii) recalculating an average and standard deviation for the remaining intersections 117. The resulting average value is the center and representative of the approximate location of the source entity 112 for a single given occurrence of emitted acoustic sound.

Figure 9:
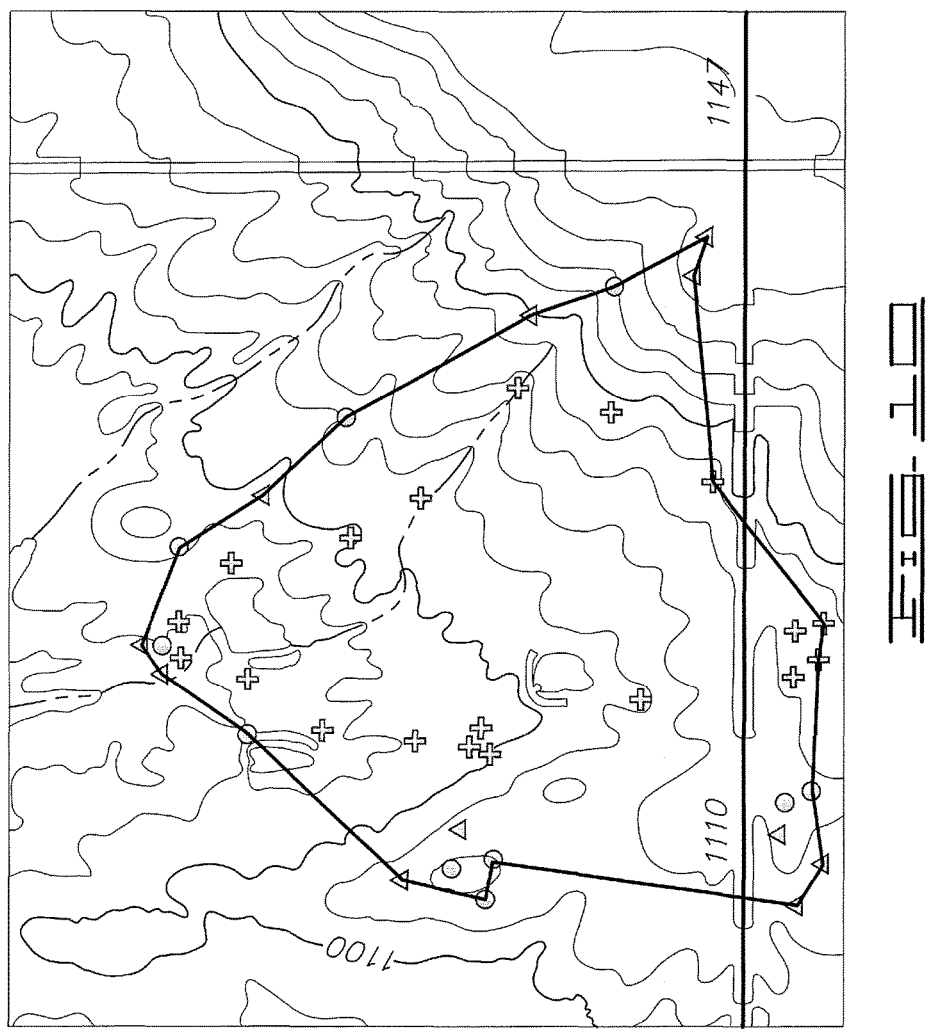
FIG. 9 is an example flow chart for the method of providing visual display of the source entity in connection with each emitted acoustic signal of a given source entity.

The determined approximate location along with the time of occurrence is saved and stored to the computing device 102 and/or a mass storage device of I/O devices 108, see e.g. step 228 of FIG. 8b and step 310 of FIG. 9.

A topographical is map is obtained from memory of the computing device 102, mass storage device, a remote database by wire, radio frequency, Bluetooth, satellite, cell phone carrier, or any combination of any of the foregoing as depicted in block 306 of a representative flow chart of FIG. 9. The determined approximate location is converted from Cartesian coordinates to a GPS map point. This map point is saved on computing device 102 and is plotted on the topographical map. Each map point is saved along with the time stamp it was produced.

Map points may be plotted in several methods, see e.g. FIG. 9 at 312-338. For example, plotting all points at once establishes the width and length of the range of the source entity 112. A polygon can be created and the corners of the polygon are recorded and can be stored. This polygon is named and time stamped for later playback. For example, when using the described system and method to track and monitor wildlife, the resulting polygon may correspond to the area the animal lives in, e.g. its "home range" or territory, see e.g. 312-316 and 324-332 of FIG. 9. Another option for displaying and rendering the timed movement of the source entity 112 is to utilize the time stamp associated with each approximate location data point. Movement direction and velocity can be illustrated by allowing the user to turn on each map point on playback which will then fade out over time to simulate the movement of the source entity 112. This data can be used to determine speed and direction as well as daytime and nighttime patterns such as roosting or resting, see e.g. 312, 318-322, and 324-328 and 334-338 of FIG. 9.

Figure 11:
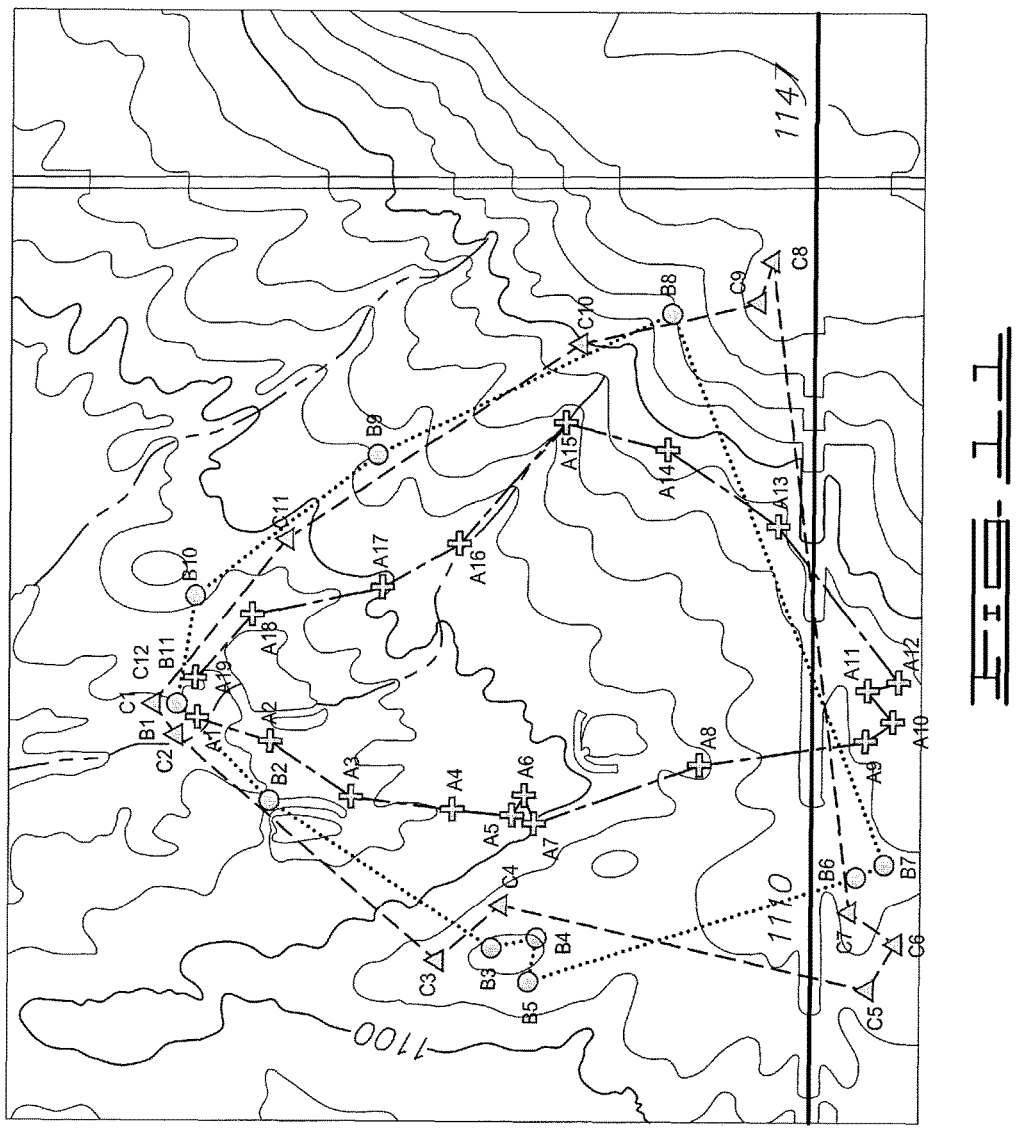
FIG. 11 illustrates an example visual display associated with the method depicted in FIG. 9 of the system and method for geolocating emitted acoustic signals from a source entity depicting three days of approximate locations representing movement of a given source entity is superimposed on a topographical map.

For example, Table 1 are data points representing the approximate position and time of each emitted acoustic signal from a source entity over a three-day period. FIGS. 10-12 are rendered visual displays corresponding to the data shown below in Table 1.

TABLE 1

| Day 1 | | Day 2 | | Day 3 | |
|---|---|---|---|---|---|
| "A",✚ | Time | "B",● | Time | "A",▲ | Time |
| A1 | 6:00 AM | B1 | 6:00 AM | C1 | 6:00 AM |
| A2 | 6:15 AM | B2 | 6:30 AM | C2 | 6:30 AM |
| A3 | 6:30 AM | B3 | 7:00 AM | C3 | 7:00 AM |
| A4 | 7:00 AM | B4 | 8:00 AM | C4 | 8:00 AM |
| A5 | 8:00 AM | B5 | 9:00 AM | C5 | 9:00 AM |
| A6 | 8:30 AM | B6 | 10:00 AM | C6 | 10:00 AM |
| A7 | 9:30 AM | B7 | 1:00 PM | C7 | 1:00 PM |
| A8 | 9:45 AM | B8 | 2:00 PM | C8 | 2:00 PM |

TABLE 1-continued

| Day 1 | | Day 2 | | Day 3 | |
|---|---|---|---|---|---|
| "A",✚ | Time | "B",● | Time | "A",▲ | Time |
| A9 | 10:00 AM | B9 | 3:30 PM | C9 | 3:00 PM |
| A10 | 11:00 AM | B10 | 4:45 PM | C10 | 4:00 PM |
| A11 | 12:00 AM | B11 | 6:00 PM | C11 | 5:00 PM |
| A12 | 1:00 PM | | | C12 | 6:00 PM |
| A13 | 2:30 PM | | | | |
| A14 | 2:45 PM | | | | |
| A15 | 3:00 PM | | | | |
| A16 | 3:30 PM | | | | |
| A17 | 4:30 PM | | | | |
| A18 | 5:00 PM | | | | |
| A19 | 6:00 PM | | | | |

FIG. 10 displays all data points from the three-day period with the "home-range" polygon drawn between the outermost data points for the three-day period.

FIG. 11 illustrates the layout of each day's movement overlaid on a topographical map.

FIG. 12 shows all data points from the three-day period with the times for each approximate location for day 1 superimposed thereon.

FIGS. 7a and 7c illustrates an example configuration of input sensors to obtain a three-dimensional vector for the system and method for geolocating emitted acoustic signals from a source entity 112. FIG. 7a illustrates the xy plane configuration of input sensors 114. By adding a fourth input sensor, e.g. 114-3, above or below the origin input sensor 114-0, the vector angle of the emitted acoustic signal(s) of source entity 112 can be determined as previously described and the z-component can be calculated as shown in FIGS. 7b and 7c.

As previously mentioned, the system and method may also be configured to distinguish between the emitted analog acoustic signal of source entities 112 of the same type, e.g. turkey 1 and turkey 2. For example, the system and method are configured to adjust the coeff value referred to above. For example, a call or vocalization from a specific source entity 112, e.g. turkey 1, can be saved and stored in the data repository 107 as another template sound. The new template sound corresponding to the vocalization will be used in subsequent identification steps. To the extent the same source entity 112, e.g. turkey 1, makes further calls, the system and method will be able to identify the vocalization as emitting from turkey 1. To the extent another turkey, e.g. turkey 2, makes vocalizations, the system will be able to identify that the vocalization is from a turkey and will recognize that the specific vocalization is not from turkey 1. If the vocalizations of turkey 2 are also saved within the data repository 107 of template sounds, the system will identify those vocalizations specific to turkey 2 and distinguish between each identified turkey and any other turkey.

In order to save the vocalization of each specific source entity 112, the system and method is configured to raise a threshold level of the value of the peak, i.e. the coefficient that triggers the data save. As a result, all subsequent saves associated with the identification and location will be of the specific source entity. The threshold level for each specific source entity by finding a baseline value by cross-correlating the template sound to itself to serve as the guide. They system and method can determine the difference in a specific animal's calls or vocalizations—to do so, the animal's call is used as the template from the template repository 107 from which the received emitted acoustic signal will be cross-correlated with. A higher threshold value will exclude all but those specific animal's vocalizations.

All data acquired from the source entity 112 can be saved to the computing device 102 of the system 100. In addition, the system may also be connected to one or more remote computing devices and such data can be saved to the remote computing devices.

A user desirable of reviewing the data can use the user interface of the system to view and manipulate the data. A user may also be remote from the system and access the system over a network or through an application hosted on the user's HMI 110 or remote computing device. For example, remote data can be viewed and data manipulated by personal computer, smart phone, tablets, and the like. Control of the computing device 102 of the system 100 may be accomplished by remote connection or directly at computing device 102. Changing the pre-recorded sounds of the template library, adjusting digital filters and/or other operational parameters, and changing the frequency of recording of the input sensors 114, as well as frequency of the analog-to-digital converters can also be accomplished from remote access or directly at computing device 102.

An example overview of the system and method of geolocating emitted acoustic signals from a source entity may include: acoustic sound is emitted in the field a source entity 112. The emitted sound is unique to that source entity 112, e.g. turkey gobble, deer grunt, etc. The emitted acoustic signal is received by a plurality of input sensors 114. The received emitted acoustic signal is converted to a digital signal representative of the acoustic signal. The conversion may be done by a single computing device associated with each input sensor or by a central computing device 102 that is operably connected to each input sensor 114. The digital signal is processed by a processor to identify the source entity as described above by comparing and correlating the modified digital signal representative of the received emitted acoustic signal with a template sound stored in a sound library of the data repository 107. The approximate position for a given emitted acoustic signal is also calculated from the origin input sensor 114-0.

If the source entity emits more than a one acoustic signal, the direction of travel of the source entity can also be determined in relation from the origin input sensor 114-0. Once the source entity 112 is identified and its approximate position determined, the corresponding data can be stored locally in the system 100 or transmitted to a remote storage device. This can be done continuously in real time, at periodic intervals, or at the command of a user of a system.

The system and method is also configured to render the data visually, for example, superimposed on a topographical map. The topographical map may be stored locally on the computing device 102 or stored remotely and transmitted to the computing device 102 or any remote device running an application to render the data. The system and method is configured to render each occurrence of emitted acoustic signal for a source entity in a number of ways, including: plotting each point in time showing movement and direction; to show all relative points at once by grouping of all points showing all locations at once to show entire range and to establish a polygon of the range and record this data, or to show each point through illustrating movement, e.g. timed movement of locations to illustrate general movement throughout the range of the source entity. This can also include showing data to establish a daily path of movement through the day, including average direction and velocity, and daytime and nighttime resting times and locations.

The system and method is also configured to store the received and processed information based on received emitted acoustic signals from a source entity, which can be used for historical purposes and each plot can be saved together and incorporated on a map for future use; group map and data points with timestamps. The saved information can be saved to the computing device of the system, a remote storage device, or other storage device known in the art. The visual rendering may be viewed by a user of the computing device of the system, a remote computing device, a HMI, or the like as previously described.

Although certain steps are described herein and illustrated in the figures as occurring sequentially, some steps may occur simultaneously with each other or in an order that is not depicted. The present disclosure of the disclosed system, methods, techniques, and functions are not to be limited to the precise descriptions and illustrations. Other embodiments will be apparent to one skilled in the art. As such, the foregoing description merely enables and describes the general uses of the described system and method. While certain embodiments of the system and method have been described for the purpose of this disclosure, those skilled in the art can make changes without departing from the spirit and scope thereof. Thus, the appended claims define what is claimed.

What is claimed is:

1. A system comprising: at least three input sensors, said at least three input sensors including an origin sensor, each of said input sensors configured to receive an acoustic signal from a source entity; and a computing device operatively connected to each of said at least three input sensors, wherein said computing device includes at least one processor configured with executable instructions that cause said at least one processor to perform operations including:
   generate a plurality of modified digital signals;
   identify said source entity of said acoustic signal based on an emitted acoustic signal of said source entity received at said input sensors; wherein the step of identifying said source entity of said acoustic signal based on said emitted acoustic signal includes the steps of:
      receiving a modified template sound, and
      cross-correlating each of said modified digital signals and said modified sound template together to produce a plurality of cross-correlated matrices to determine if a match between said modified digital signal and said modified sound template exists, such that said match corresponds to identifying an identity of said source entity; and
   determine an approximate position of said source entity based on said emitted acoustic signal, wherein the step of determining an approximate position of said source entity based on said emitted acoustic signal includes the steps of:
      analyzing a peak of each of said plurality of modified digital signals to obtain a plurality of time difference values, wherein said peak corresponds to a magnitude of said peak and a time corresponding to said magnitude of said peak, wherein said analyzing step includes taking a difference between a peak of a modified digital signal obtained from said acoustic signal received at said origin sensor and each modified digital signal obtained from said acoustic signal received at each of said other input sensors to obtain each of said plurality of time difference values, and
      for each plurality of time difference values, determining an intersection between each of said plurality of time difference values;
      identifying a quadrant from where said source entity emitted said acoustic signal;
      calculating a standard deviation and a center of said plurality of time difference values and omitting from said calculating step one or more intersections of time difference values of input sensors not in the same identified quadrant of said source entity, wherein said approximate position of said source entity is said center.

2. The system of claim 1, wherein the step of generating includes the steps of: receiving a plurality of digital signals representative of said emitted acoustic signal received at said plurality of input sensors, and modifying each of said plurality of digital signals to create said plurality of modified digital signals by taking an absolute value of all values of each of said plurality of digital signals and adjusting a maximum value of the absolute value of each of said plurality of digital signals to one.

3. The system of claim 1, wherein said system further comprises a remote computing device in communication with said computing device, wherein said remote computing device includes a processor configured to visually display said approximate position of said source entity for each emitted acoustic signal by said source entity on a display screen of said remote computing device.

4. The system of claim 1, wherein said receiving a plurality of digital signals representative of said emitted acoustic signal received at said plurality of input sensors includes the step of processing said received emitted acoustic signal from each of said plurality of input sensors and converting each of said received acoustic signal to said plurality of digital signals representative of said emitted acoustic signal.

5. The system of claim 1, wherein said modified template sound is obtained by said processor by modifying a sound template stored in a sound database operably coupled to said processor, by taking an absolute value of all values of said sound template and adjusting a maximum value of the absolute value of said sound template to one.

6. The system of claim 1, wherein said source entity is a biological entity.

7. The system of claim 1, wherein said at least three input sensors are microphones.

8. The system of claim 1, wherein the steps of identifying said source entity and determining an approximate position of said source entity are performed by the processor simultaneously.

9. The system of claim 1, wherein the step of identifying said source entity is performed by the processor before the step of determining an approximate position of said source entity is performed by the processor.

10. The system of claim 1, wherein the step of identifying said source entity is performed by the processor after the step of determining an approximate position of said source entity is performed by the processor.

11. A method for identifying and locating an acoustic signal emitted from a source entity and received at a plurality of input sensors, including an origin sensor, the method comprising the steps of:
   generating, by a processor, a plurality of modified digital signals;
   identifying, by the processor, said source entity of said acoustic signal based on said emitted acoustic signal, wherein the step of identifying said source entity of said acoustic signal based on said emitted acoustic signal includes the steps of:

receiving a modified template sound, and cross-correlating each of said plurality of modified digital signals and said modified template sound together to produce a plurality of cross-correlated matrices to determine if a match between said plurality of modified digital signals and said modified template sound exists, such that said match corresponds to identifying an identity of said source entity; and determining, by the processor, an approximate position of said source entity based on said emitted acoustic signal, wherein the step of determining an approximate position of said source entity based on said emitted acoustic signal includes the steps of:

analyzing a peak of each of said plurality of modified digital signals to obtain a plurality of time difference values, wherein said peak corresponds to a magnitude of said peak and a time corresponding to said magnitude of said peak, wherein said analyzing step includes taking a difference between a peak of a modified digital signal obtained from said acoustic signal received at said origin sensor and each modified digital signal obtained from said acoustic signal received at each of said other input sensors to obtain each of said plurality of time difference values, and for each plurality of time difference values, determining an intersection between each of said plurality of time difference values;

identifying a quadrant from where said source entity emitted said acoustic signal;

calculating a standard deviation and a center of said plurality of time difference values and omitting from said calculating step one or more intersections of time difference values of input sensors not in the same identified quadrant of said source entity, wherein said approximate position of said source entity is said center.

12. The method of claim 11, wherein the step of generating includes the steps of: receiving a plurality of digital signals representative of said emitted acoustic signal received at said plurality of input sensors, and modifying each of said plurality of digital signals to create said plurality of modified digital signals by taking an absolute value of all values of each of said plurality of digital signals and adjusting a maximum value of the absolute value of each of said plurality of digital signals to one.

13. The method of claim 11, further comprising the step of visually displaying said approximate position of said source entity for each emitted acoustic signal by said source entity on a display screen of a remote computing device.

14. The method of claim 11, wherein said receiving a plurality of digital signals representative of said emitted acoustic signal received at said plurality of input sensors includes the step of processing said received emitted acoustic signal from each of said plurality of input sensors and converting each of said received acoustic signal to said plurality of digital signals representative of said emitted acoustic signal.

15. The method of claim 11, wherein said modified template sound is obtained by said processor by modifying a sound template stored in a sound database operably coupled to said processor, by taking an absolute value of all values of said sound template and adjusting a maximum value of the absolute value of said sound template to one.

16. The method of claim 11, wherein said source entity is a biological entity.

17. The method of claim 11, wherein said input sensors are microphones.

18. The method of claim 11, wherein the steps of identifying said source entity and determining an approximate position of said source entity are performed by the processor simultaneously.

19. The method of claim 11, wherein the step of identifying said source entity is performed by the processor before the step of determining an approximate position of said source entity is performed by the processor.

20. The method of claim 11, wherein the step of identifying said source entity is performed by the processor after the step of determining an approximate position of said source entity is performed by the processor.

* * * * *